(12) United States Patent
Barvesten et al.

(10) Patent No.: US 11,654,834 B2
(45) Date of Patent: May 23, 2023

(54) DEVICE MOUNT FOR A VEHICLE

(71) Applicant: Spotify AB, Stockholm (SE)

(72) Inventors: Mats Barvesten, Stockholm (SE); Tobias Christopher Tilman Berneth, Stockholm (SE); Andreas Erik Cedborg, Stockholm (SE); Anders Erik Arnqvist, Stockholm (SE)

(73) Assignee: Spotify AB, Stockholm (SE)

( * ) Notice: Subject to any disclaimer, the term of this patent is extended or adjusted under 35 U.S.C. 154(b) by 18 days.

(21) Appl. No.: 17/606,352

(22) PCT Filed: Apr. 29, 2020

(86) PCT No.: PCT/EP2020/061955
§ 371 (c)(1),
(2) Date: Oct. 25, 2021

(87) PCT Pub. No.: WO2020/221829
PCT Pub. Date: Nov. 5, 2020

(65) Prior Publication Data
US 2022/0250553 A1      Aug. 11, 2022

(30) Foreign Application Priority Data
Apr. 29, 2019   (SE) .................................. 1950513-0

(51) Int. Cl.
*B60R 11/02*   (2006.01)
*B60R 11/00*   (2006.01)

(52) U.S. Cl.
CPC ......... *B60R 11/02* (2013.01); *B60R 2011/007* (2013.01); *B60R 2011/0008* (2013.01);
(Continued)

(58) Field of Classification Search
CPC ................ B60R 2011/0008; B60R 2011/0085
(Continued)

(56) References Cited

U.S. PATENT DOCUMENTS

D338,138 S   *   8/1993   Miyajima .................... D12/420
5,593,124 A  *   1/1997   Wang .................. B60R 11/0241
                                                       248/225.11
(Continued)

FOREIGN PATENT DOCUMENTS

CN      108462777          8/2018
DE      20010848 U1        12/2000
(Continued)

OTHER PUBLICATIONS

International Search Report and Written Opinion for PCT Application No. PCT/EP2020/061955 dated Mar. 7, 2020 (9 pages).
(Continued)

*Primary Examiner* — Justin M Larson
(74) *Attorney, Agent, or Firm* — Merchant & Gould P.C.

(57) ABSTRACT

An apparatus for supporting a media playback device on a structure of a vehicle comprising a grille, the apparatus comprising an elongate base body having a front side configured to connect the apparatus to the media playback device and a rear side, and first and second connection members, each comprising a respective connection portion protruding away from the rear side of the base body and comprising at least one slot configured to receive a bar of a grille, wherein the first and second connection members are translatably arranged such that the distance between the first and second connection members may be varied.

19 Claims, 11 Drawing Sheets

(52) U.S. Cl.
CPC .............. *B60R 2011/0059* (2013.01); *B60R 2011/0084* (2013.01)

(58) Field of Classification Search
USPC ........................................................ 224/483
See application file for complete search history.

(56) References Cited

U.S. PATENT DOCUMENTS

| | | | |
|---|---|---|---|
| 5,961,083 A | 10/1999 | Hartmann et al. | |
| 6,441,872 B1* | 8/2002 | Ho | B60R 11/0235 361/679.01 |
| D463,219 S * | 9/2002 | Tsai | D7/620 |
| D664,147 S * | 7/2012 | Zhao | D14/452 |
| 9,845,038 B2* | 12/2017 | Mak | B60N 3/103 |
| 10,308,191 B2* | 6/2019 | Richter | B60R 11/02 |
| 10,315,585 B2* | 6/2019 | Minn | B60R 11/0241 |
| 2005/0236541 A1 | 10/2005 | Chang | |
| 2014/0029123 A1 | 1/2014 | Qian et al. | |
| 2021/0178862 A1* | 6/2021 | Alves | B60R 11/02 |
| 2021/0185103 A1* | 6/2021 | Barvesten | G06F 1/1632 |
| 2022/0242332 A1* | 8/2022 | Barvesten | B60R 11/02 |
| 2022/0250553 A1* | 8/2022 | Barvesten | B60R 11/02 |
| 2022/0371524 A1* | 11/2022 | Hwang | B60R 11/00 |

FOREIGN PATENT DOCUMENTS

| | | |
|---|---|---|
| DE | 202004007340 U1 | 7/2004 |
| DE | 102008060872 | 11/2009 |
| DE | 202014101737 | 5/2014 |
| EP | 2119599 | 11/2009 |
| EP | 3564794 A1 | 11/2019 |
| WO | 2016/049026 A1 | 3/2016 |

OTHER PUBLICATIONS

European Communication pursuant to Article 94(3)EPC in Application 20724761, dated Sep. 26, 2022, 5 pages.
PCT International Preliminary Report on Patentability in Application PCT/EP2020/061955, dated Nov. 11, 2021, 7 pages.

* cited by examiner

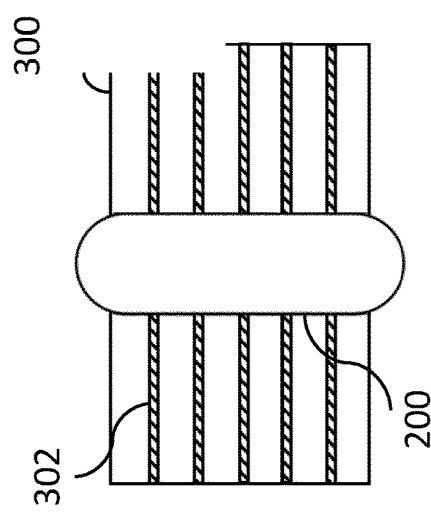
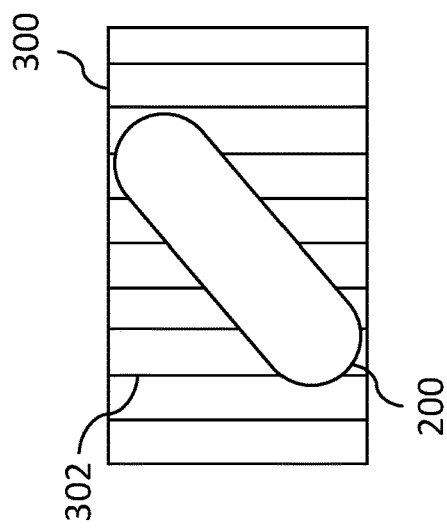
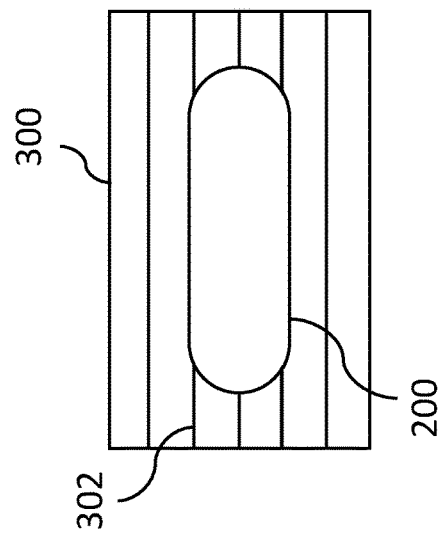
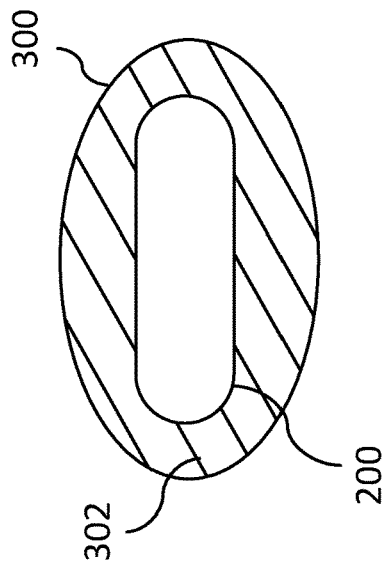
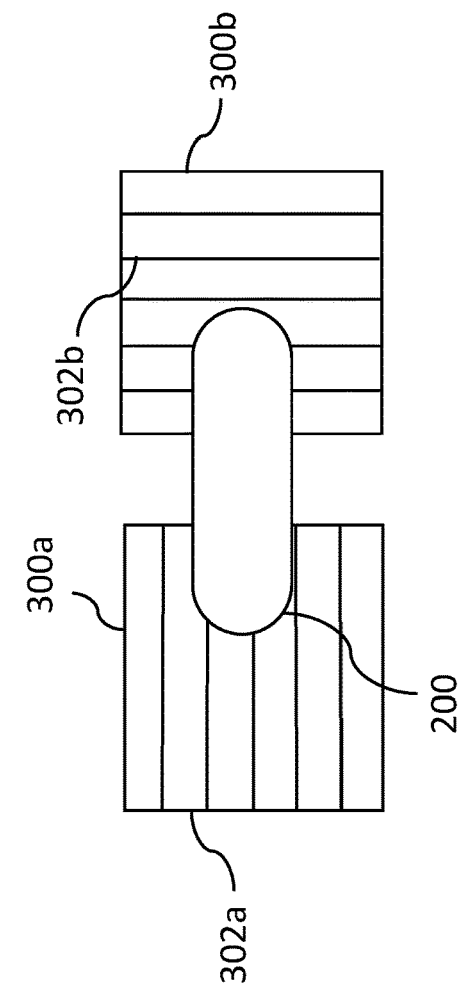

DEVICE MOUNT FOR A VEHICLE

CROSS-REFERENCE TO RELATED APPLICATION(S)

This application is a National Stage Application of PCT/EP2020/061955, filed 29 Apr. 2020, which claims benefit of Application No. 1950513-0, filed 29 Apr. 2019 in Sweden, and which applications are hereby incorporated by reference in their entireties. To the extent appropriate, a claim of priority is made to each of the above disclosed applications.

FIELD

The present disclosure relates to an apparatus for supporting a media playback device. In particular, the disclosure relates to an apparatus for supporting a media playback device on a grille of a vehicle.

BACKGROUND

Many people enjoy consuming media content while travelling or during other activities. For example, many drivers and passengers listen to audio content, such as songs, albums, podcasts, audiobooks, and other types of audible content, in vehicles. Typical sources of such audio content in vehicles include media playback devices, such as mobile phones or tablets running audio streaming applications, which can offer a personalized and flexible music-consuming experience using large catalogues of media content available from a media content server.

It is advantageous that such media playback devices are mounted, for example on a dashboard of a vehicle, so that they are easily and safely accessible by a user, for example a driver of the vehicle. Suitable mounting of the device can ensure that a user may easily interact with the device without his or her attention being taken away from important activities such as driving.

However, current mounting arrangements for such media playback devices can be limited in their application, due to the limited number of places on a vehicle to which they can be connected. This can mean that a mounting arrangement may only be able to be connected to a vehicle in one place or in one orientation. This can also mean that mounting arrangements that are suitable for one vehicle may not be suitable for other vehicles, limiting the usability of such devices. Current mounting arrangements further may not provide a secure attachment to a vehicle when the vehicle is in motion, as vibrations that are present when the vehicle is moving may cause the mounting arrangement to become dislodged.

Therefore, there exists a need for an apparatus for supporting a media playback device that is versatile in its application and provides a secure attachment throughout its use.

SUMMARY

The present disclosure provides an apparatus that aims to provide at least some of these advantages. In particular, the disclosure relates to a mounting device that can be attached to a grille of a vehicle, for example on a vent or fan, to provide a versatile and secure connection to the vehicle. The mounting device comprises connection members that provide the connection to the grille. The connection members may be movable in order to allow different configurations when the mounting device is attached to the grille. For example, the connection members may be translatable, for example slidable, and/or rotatable. The mounting device can then be attached to a media playback device such that the media playback device can be easily seen and accessed by a driver of the vehicle. The mounting device can be attached and removed as the user desires, so that it can be moved for example between different vehicles.

In accordance with an aspect of the disclosure there is provided an apparatus for supporting a media playback device on a structure of a vehicle comprising a grille, the apparatus comprising an elongate base body having a front side configured to connect the apparatus to the media playback device and a rear side, and first and second connection members, each comprising a respective connection portion protruding away from the rear side of the base body and comprising at least one slot configured to receive a bar of a grille, wherein the first and second connection members are translatably arranged such that the distance between the first and second connection members may be varied.

Optionally, one or both of the first and second connection members are slidably arranged such that the distance between the first and second connection members may be varied. Optionally, the base body comprises an elongated opening extending along the length of the base body towards, wherein the first and second connection members are slidably arranged in the elongated opening. Optionally, the base body comprises a countersunk surface arranged adjacent to the elongated opening for supporting the respective first and second connection members. Optionally, the base body comprises first and second elongated openings extending from respective ends of the base body towards the centre of the base body, wherein the first connection member is slidably arranged in one of the first and second elongated openings, and the second connection member is slidably arranged in the other of the first and second elongated openings. Optionally, the base body comprises first and second countersunk surfaces arranged adjacent to the first and second elongated openings for supporting the respective first and second connection members.

Optionally, the first and second connection members each comprise an engagement element configured to engage the base body and allow sliding motion of the connection member relative to the base body when a user applies a sliding force, and to resist sliding motion of the connection member relative to the base body when a user does not apply a sliding force.

Optionally, the connection portions of the first and second connection members each comprise at least two tongues, arranged spaced apart, so that a slot configured to receive a bar of a grille is formed therebetween.

Optionally, the first and second connection portions are rotatably arranged about their respective centre axes so that the orientation of the respective slots of the first and second connection portions may be varied. Optionally, the first and second connection members each comprise a head portion configured to connect the respective connection member to the base body, and the connection portion of each connection member is journalled in the respective head portion such that the connection portion may be rotated relative to the head portion. Optionally, the first and second connection members each comprise a locking mechanism arranged between the head portion and the connection portion and configured such that the orientation of the slot is releasably locked.

Optionally, the front side of the base body is configured to detachably connect the apparatus to the media playback device. Optionally, the apparatus further comprises an attachment member disposed in front of the base body, the attachment member configured to connect the apparatus to the media playback device. Optionally, the attachment member comprises a magnetic element. Optionally, the magnetic element is removably attached to the apparatus. Optionally, the attachment member is connected to the first or second connection member. Optionally, the attachment member is disposed on the front face of the base body. Optionally, the attachment member is connected to the base body. Optionally, the attachment member comprises a ball joint.

In accordance with an aspect of the disclosure there is provided an apparatus for supporting a media playback device on a structure of a vehicle comprising a grille, the apparatus comprising an elongate base body having a front side configured to connect the apparatus to the media playback device and a rear side, and first and second connection members, each comprising a respective connection portion protruding away from the rear side of the base body and comprising at least one slot configured to receive a bar of a grille, wherein the first and second connection portions are rotatably arranged about their respective centre axes so that the orientation of the respective slots of the first and second connection portions may be varied.

BRIEF DESCRIPTION OF THE DRAWINGS

Exemplary embodiments of the disclosure shall now be described with reference to the drawings in which:

FIG. 8A illustrates a mounting device installed on a grille in one configuration.

FIG. 8B illustrates the mounting device installed on a grille in a different configuration;

FIG. 8C illustrates the mounting device installed on a grille in a different configuration;

FIG. 8D illustrates the mounting device installed on a grille in a different configuration; and FIG. 8E illustrates the mounting device installed on a grille in a different configuration.

Throughout the description and the drawings, like reference numerals refer to like parts.

SPECIFIC DESCRIPTION

Many people enjoy listening to audio content, such as songs, albums, podcasts, audiobooks, and other types of audible content, in vehicles. It is typical for a driver or and passenger to bring a media playback device running audio streaming applications, such as a mobile phone, into a vehicle in order to offer a personalized and flexible music-consuming experience using large catalogues of media content available from a media content server.

Figure 1:
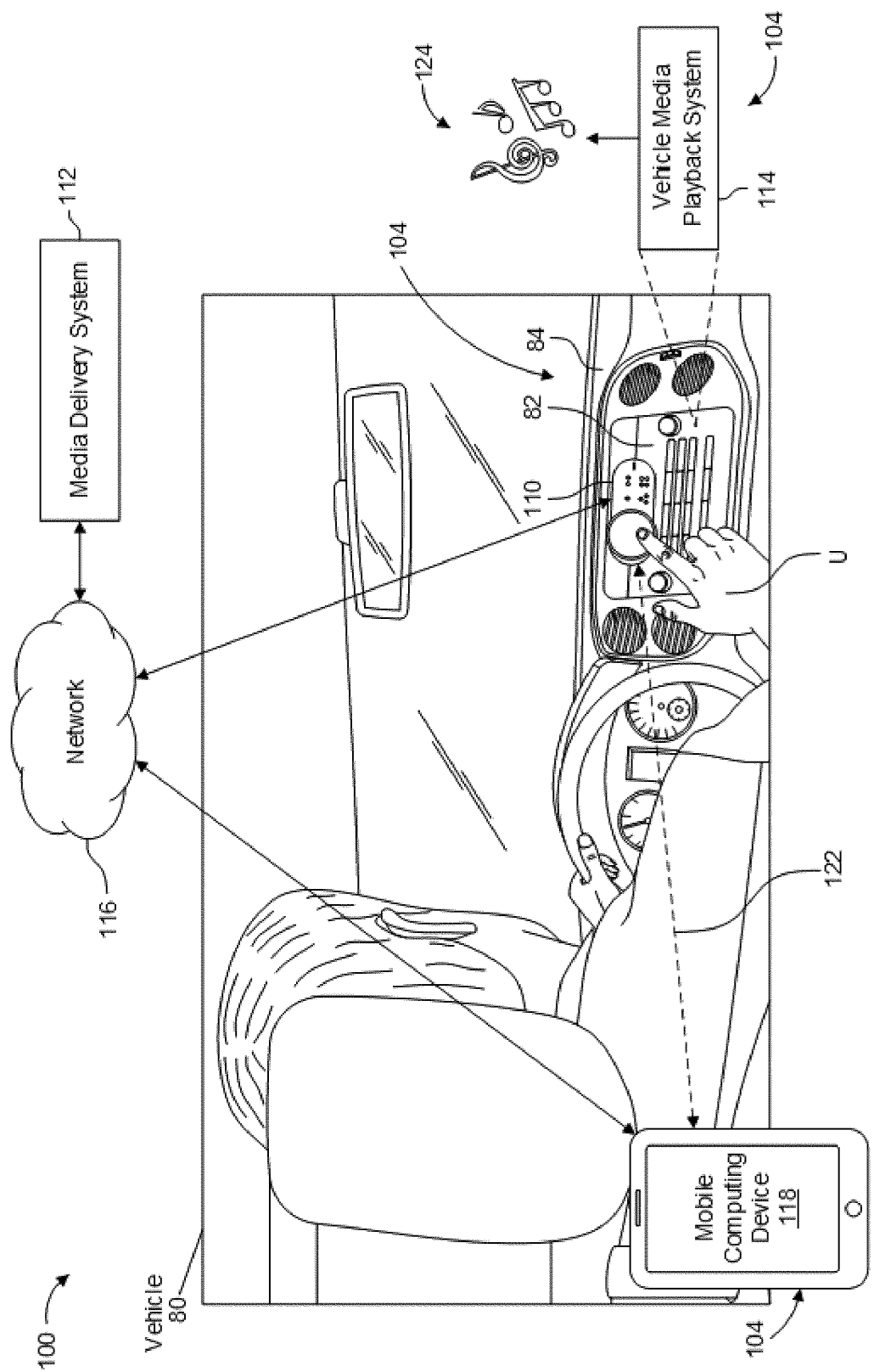
FIG. 1 illustrates an example system for streaming media content for playback.

FIG. 1 illustrates an example system 100 for streaming media content for playback that can be used in a vehicle 80. The system 100 includes one or more media playback devices 104 configured to play media content. Examples of the media playback devices 104 include one or more of a personal media streaming appliance (PMSA) system 110, and a mobile computing device 118. The system 100 also includes one or more of a media delivery system 112 and a vehicle media playback system 114. Data communication within the system 100 can occur using one or more of a data communication network 116 and an in-vehicle wireless data communication network 122. The system 100 may be substantially as described in European patent application no. 18170555.9, and details of its structure and function will not be discussed here. In brief, the system 100 is operable to generate a media output 124 to play media content in the vehicle 80. The vehicle 80 includes a dashboard 82 or a head unit 84. In many cases, a user U wishes to mount a media playback device 104, for example the PMSA system 110, within the vehicle 80, for example on the dashboard 82. Other examples of media playback devices 104 include smartphones, portable media players, tablets and the like.

Figure 2A:
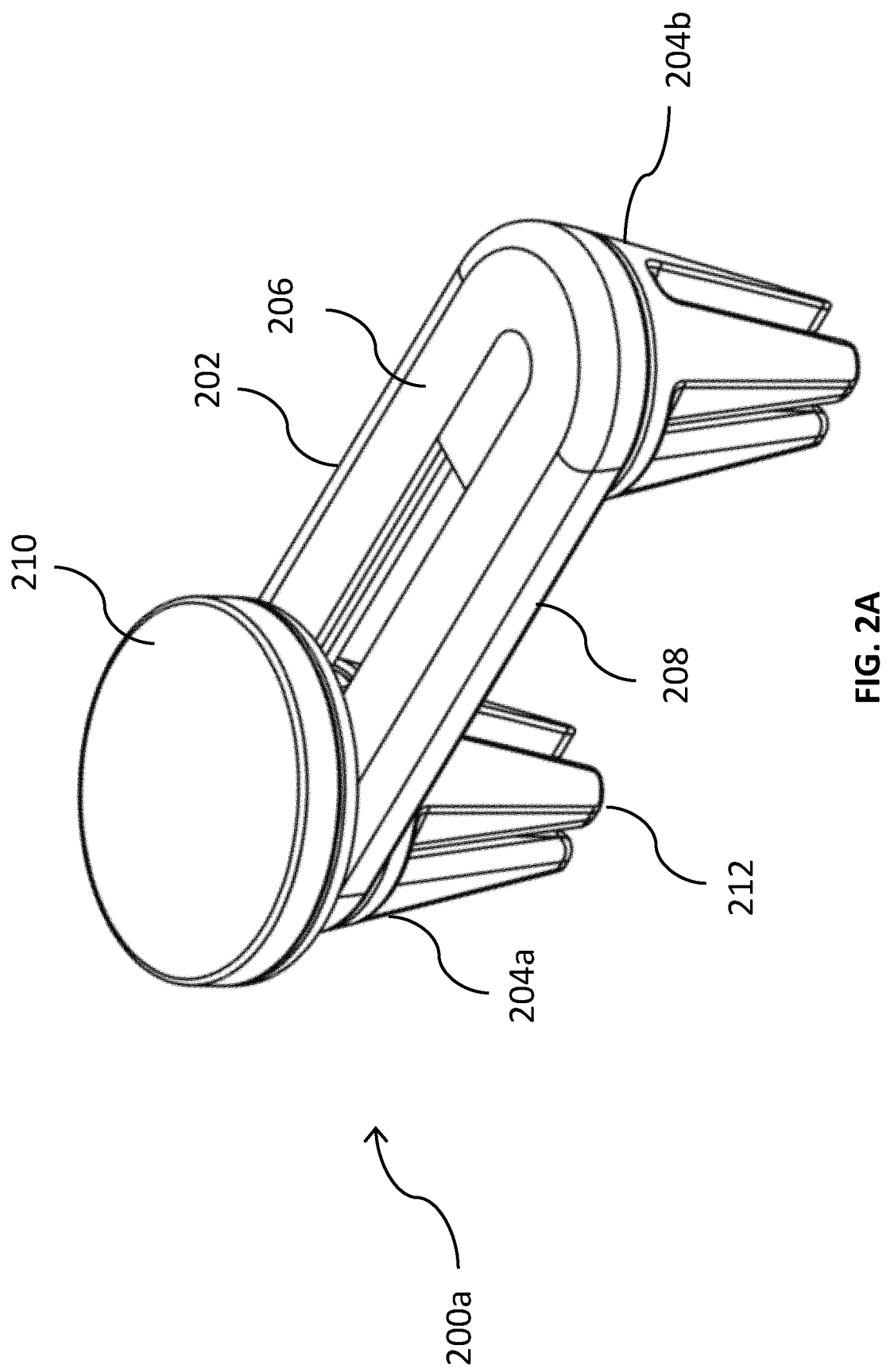
FIG. 2A illustrates a mounting device according to an embodiment.
Figure 2B:
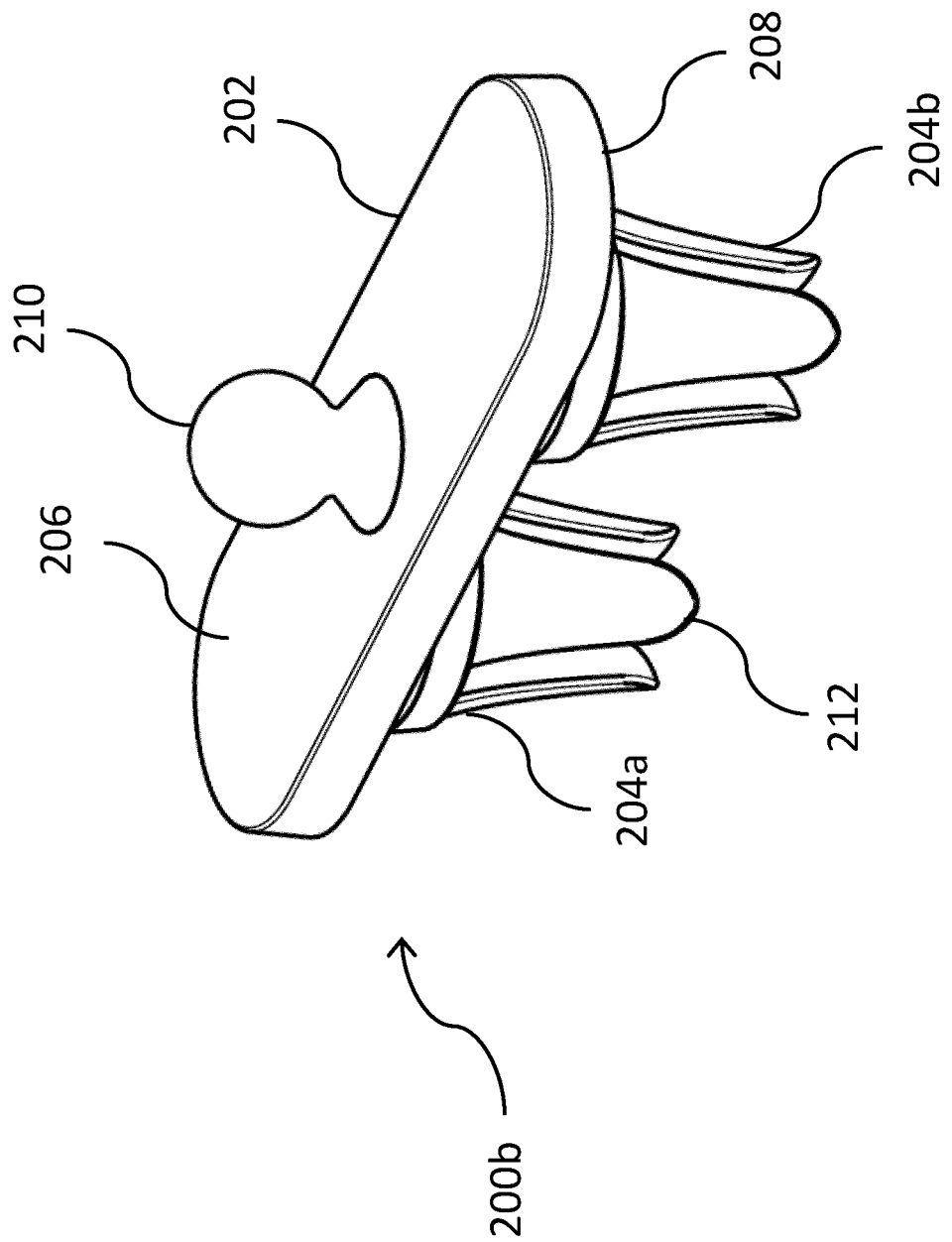
FIG. 2B illustrates a mounting device according to another embodiment.

FIGS. 2A and 2B illustrate examples of a mounting device 200 (including mounting devices 200a and 200b) for supporting a media playback device 104 within the vehicle 80. Specifically, the mounting devices 200 are configured to attach to a grille of the vehicle 80, for example the grille of a ventilation device such as a fan or vent. A vehicle 80 typically has a number of such ventilation devices, and therefore the mounting devices 200 provides the user U with a large selection of possible mounting configurations. Such ventilation devices are often in a prominent position on the dashboard 82 or head unit 84 of the vehicle 80, and therefore provide suitable positions for the mounting of a media playback device 104. A media playback device 104 can then be attached to the mounting device 200 such that it is mounted in the vehicle 80 and can be easily seen and interacted with by the user U.

As shown in FIGS. 2A-B, the mounting devices 200 comprise a base body 202 and a plurality of connection members 204a-b. The base body has a front side 206 and a rear side 208. The front side 206 is configured to connect the apparatus to a media playback device 104, and may have an attachment member 210 for providing this functionality.

The connection members 204 extend away from the rear side 208 of the base body 202 to enable connection to a grille of the vehicle. Each connection member 204 comprises a connection portion 212 protruding away from the rear side 208 of the base body 202. Each connection portion 212 comprises at least one slot, configured to receive a bar of a grille, as will be described in relation to FIGS. 5A-D. The use of multiple connection members 204 provides a more secure connection to the grille of a vehicle than devices that only have a single connection member. Similarly, the mounting devices 200 can support more weight with an increased number of connection members 204. Although two connection members 204a-b are shown, it will be envisaged that any suitable number of connection members could be used.

In some embodiments, the connection members 204 are configured to permanently connect a mounting device 200 to a grille. In other embodiments, the connection members 204 are configured to detachably connect the mounting device 200 to a grille. This ensures that a mounting device 200 can be removed and reused multiple times in the same vehicle or different vehicles. For example, the user U may not have a single main vehicle, and may want to use the mounting device in various vehicles, for example rental cars. In another example, certain users may find it easier to attach a media playback device 104 to a mounting device 200 when the mounting device 200 is not installed on a grille. It is therefore advantageous that the user U can remove the mounting device 200, detach a first media playback device 104, attach a second media playback device 104, and then reinstall the mounting device 200 such that the second media playback device 104 is now mounted securely in the vehicle.

As discussed above, the front side 206 of the base body 202 is configured to connect the mounting device 200 to a media playback device 104, and may have an attachment member 210 for providing this functionality. In some embodiments, the attachment member 210 is configured to permanently connect the mounting device 200 to a media playback device 104. In other embodiments, the attachment member 210 is configured to detachably connect the mounting device 200 to a media playback device 104. In this way, the user U can easily switch between different media playback devices 104 using the same mounting device 200, and need not have a separate mounting device 200 for each media playback device 104. This may also enable the user U to switch between media playback devices 104 while the mounting device 200 is installed. In some embodiments, the attachment member 210 connects the mounting device 200 to a media playback device 104 indirectly. That is to say, the attachment member 210 connects to one or more intermediate devices, which in turn connect to the media playback device 104. For example, in one embodiment, the mounting device 200 may be connected to a dock, and the dock connected to a media playback device 104.

In the embodiment shown in FIG. 2A, the attachment member 210 comprises a magnetic assembly. The magnetic assembly will be described in more detail in relation to FIG. 7. The magnetic assembly, or other type of a magnetic element of an attachment member 210, may connect to a corresponding ferromagnetic portion of a media playback device 104 or an intermediate device. In the embodiment shown in FIG. 2B, the attachment member 210 is a ball joint that is attached to the base body 202. The ball joint may connect to a corresponding socket of a media playback device 104 or an intermediate device. It will be envisaged that many other types of attachment could be used to connect a mounting device 200 to a media playback device 104. In some embodiments, the attachment member 210 may be a flat face with an adhesive part, such that a media playback device 104 can be attached to a mounting device 200 by adhesion.

Figure 3A:
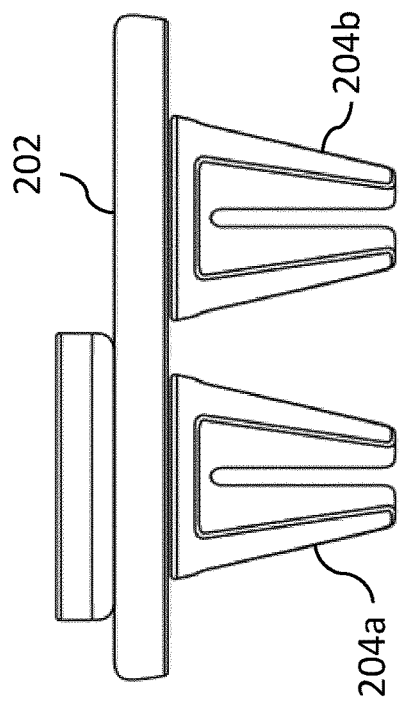
FIG. 3A illustrates the mounting device of FIG. 2 with connection members arranged in a translatable position.
Figure 3B:
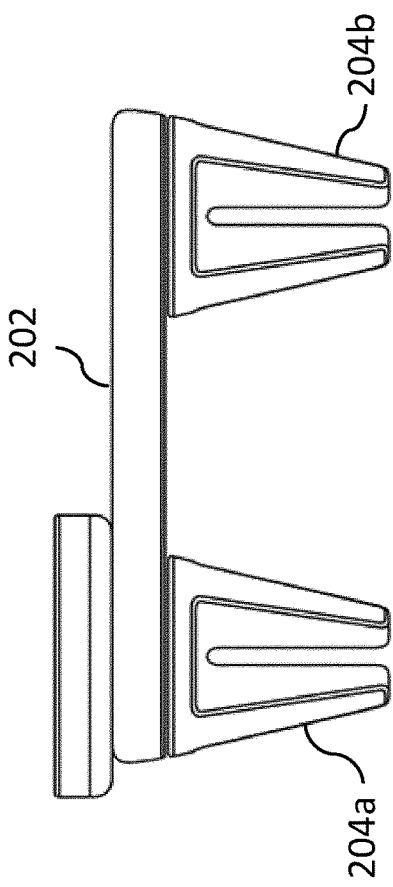
FIG. 3B illustrates the mounting device of FIG. 2 with connection members arranged in a different translatable position.

To enable connection to grilles of different shapes and sizes, one or both of the connection members 204 may be translatable relative to the base body 202. FIGS. 3A to 3D show the connection members 204 in different positions relative to the base body 202. FIG. 3A shows the first and second connection members 204a-b positioned at each end of the base body 202. In this case, the distance between the first and second connection members 204a-b is at the maximum, and may be limited by the ends of the base body 202. In FIG. 3B, the first and second connection members 204a-b have both been moved to a more central position on the base body 202. In another example, the first and second connection members 204a-b could be arranged such that they are in contact (the distance between them is zero).

It is shown in FIG. 3B that the attachment member 210 is coupled to the first connection member 204a and moves along with the first connection member 204a. It will be envisaged that an attachment member 210 may additionally or alternatively be coupled to the second connection member 204b and move along with the second connection member 204b. In other embodiments, such as in the mounting device 200b shown in FIG. 2B, the attachment member 210 may be coupled to the base body 202 such that it is in a fixed position relative to the base body.

Figure 3C:
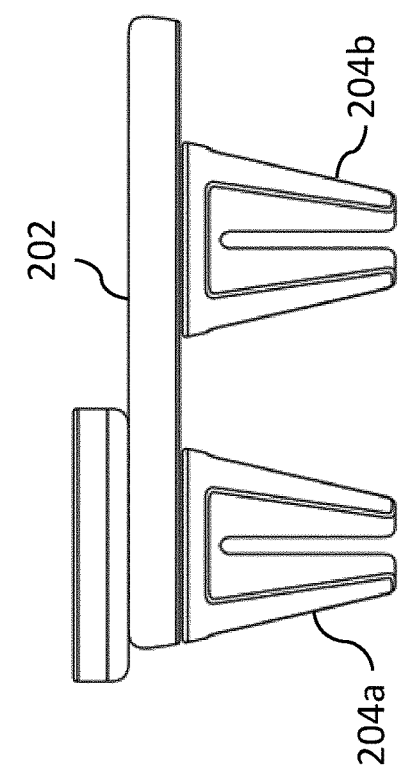
FIG. 3C illustrates the mounting device of FIG. 2 with connection members arranged in a different translatable position.
Figure 3D:
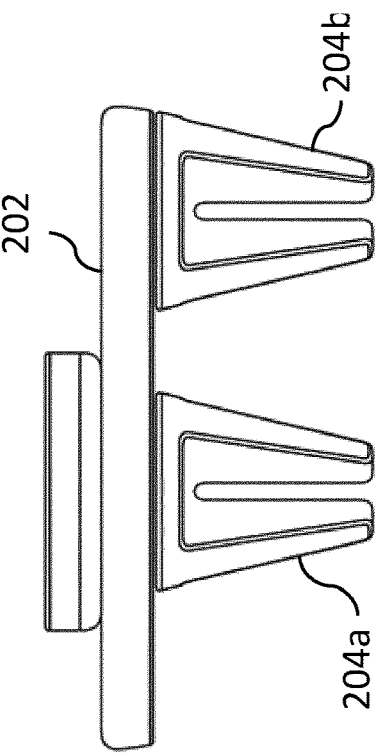
FIG. 3D illustrates the mounting device of FIG. 2 with connection members arranged in a different translatable position.

In some embodiments, the connection members 204 are independently translatable. That is to say, one of the first and second connection members 204a-b may be moved further from a respective end of the base body 202 than the other. FIG. 3C shows an example where the second connection member 204b has been moved to a more central position, whereas the first connection member 204a is positioned at the end of the base body 202. FIG. 3D shows an example where the first connection member 204a has been moved to a more central position, whereas the second connection member 204b is positioned at the end of the base body 202. It will be appreciated that each of the first and second connection members 204a-b could be positioned at any point along the base body 202 between the two ends of the base body 202. For example, both connection members 204 may be arranged towards one end of the base body 202.

By implementing connection members 204 that are translatably positioned in relation to the base body 202 and to each other, the mounting devices 200 can be securely attached to grilles of different shapes and sizes. For example, at their maximum separation, the first and second connection members 204a-b could connect to large grilles or even span a distance between two adjacent grilles. In another example, at their minimum separation, the first and second connection members 204a-b could both connect to the same, small grille. The ability to move the connection members 204 independently between the two extreme positions allows the mounting device 200 to be attached to a large variety of grilles and grille sets. It will be envisaged that using different numbers of connection members 204 would allow different installation configurations. This is discussed in more detail in relation to FIGS. 8A-E.

Figure 4A:
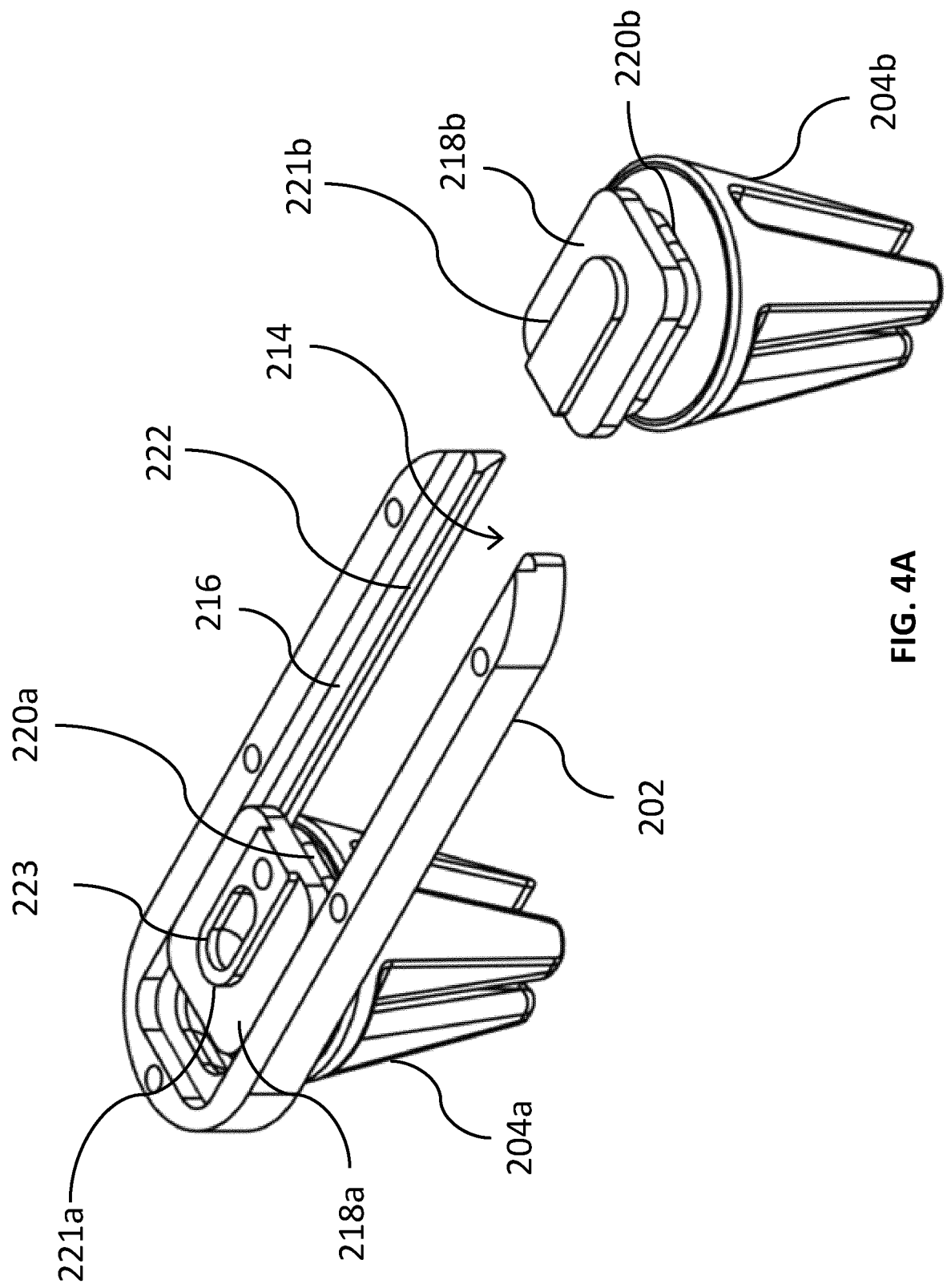
FIG. 4A illustrates the sliding mechanism of the mounting device of FIG. 2.

In some embodiments, the connection members 204 are slidably arranged to provide the translation discussed in relation to FIG. 3A-D. FIG. 4A shows a view of an example of the mounting device 200a with a cover of the base body 202 removed. As such, the mechanism that allows the sliding of the connection members 204 is visible. The first connection member 204a is shown connected to the base body 202, while the second connection member 204b is shown separate to the mounting device 200 to illustrate clearly the structure of the sliding mechanism.

The base body 202 comprises an elongated opening 214 for receiving the connection members 204. The elongated opening 214 extends from one end of the base body 202 towards the other end of the base body 202. Each connection member 204*a-b* is slidably arranged in the opening 214. The slidability is enabled by a countersunk surface 216 arranged in the base body 202 and adjacent to the opening 214 for supporting the connection members 204. The countersunk surface 216 extends around the perimeter of the opening 214. The connection members 204 each comprise a head portion 218 configured to connect the respective connection member 204*a-b* to the base body 202. Specifically, the head portion 218*a-b* of each connection member 204*a-b* sits on the countersunk surface 216. The use of the opening 214 to receive the connection members 204 enables simple assembly of the mounting device 200, as each connection member 204*a-b* can be slid into the base body from the open end. When the cover is attached, the open end is closed and the connection members 204 are held in the opening 214.

The head portions 218 shown in FIG. 4A are generally rectangular, to fit the corresponding rectangular shape of the opening 214. However, it will be envisaged that many different shapes of opening 214 and head portion 218 could be implemented and achieve the same function. The head portions may comprise a raised part 221, which is configured to sit in an elongated hole in a cover portion of the mounting device 200, as shown in FIG. 2A. The elongated hole may have dimensions roughly corresponding to those of the elongated opening 214. The raised part serves to stabilise the sliding of the connection member 204 along the opening 214. The head portions 218 may also comprise a fastening element 223 arranged on the raised part 221 to enable an attachment member 210 to be coupled to the connection member 204, as will be discussed in relation to FIG. 7. In FIG. 4*a*, a fastening element 223 is shown on the first connection member 204*a* only, but it will be appreciated that the second connection member 204*b* may alternatively or additionally comprise a fastening element 223 for attachment to an attachment member 210. It will be appreciated that any suitable fastening mechanism could be used to implement the fastening element 223.

Each connection member 204 also comprises an engagement element 220, for example an O-ring. The engagement elements 220 may be formed of a resilient material, such as rubber. Each engagement element 220*a-b* is configured to contact a corresponding inner surface 222 of the opening 214. The engagement between an engagement element 220 and the inner surface 222 provides a degree of resistance against the sliding of each connection member 204 in the opening 214. The engagement elements 220 can be formed of a suitable shape and material such that the resistance provided is such to allow sliding motion of the connection members 204 relative to the base body 202 when a user U applies a sliding force, but also resist sliding motion of the connection member 204 relative to the base body 202 when the user U does not apply a sliding force. That is to say, the engagement elements 220 prevent the connection members 204 from sliding within the opening 214 unless a force is applied by a user U to effect such sliding. In this way, when the connection members 204 are positioned relative to each other, that positioning is maintained when then mounting device 200 is attached to a grille of a vehicle, and a secure connection is provided.

Figure 4B:
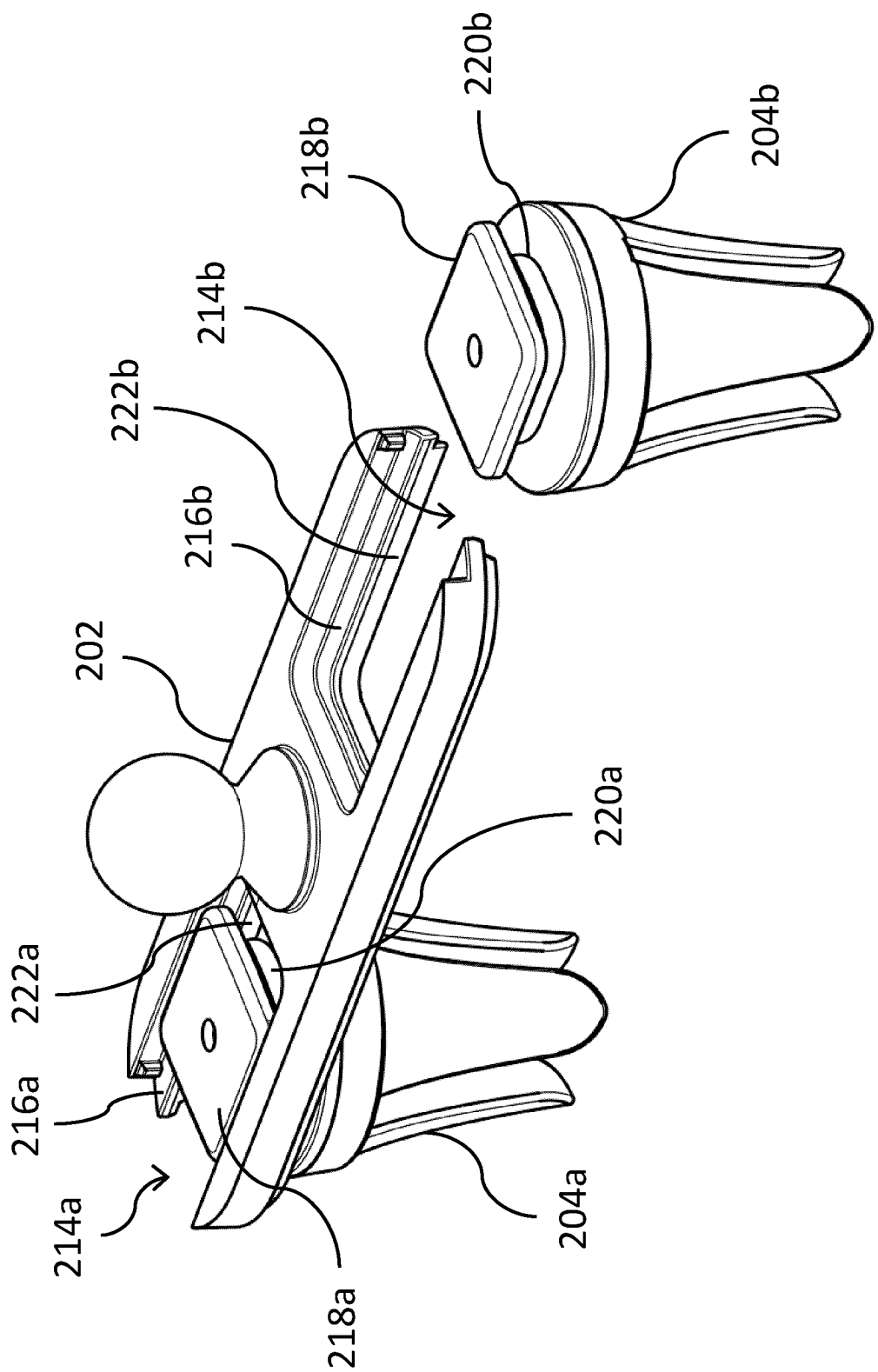
FIG. 4B illustrates the sliding mechanism of the mounting device of FIG. 3.

FIG. 4B shows a view of the mounting device 200*b* with a cover of the base body 202 removed. As such, the mechanism that allows the sliding of the connection members 204 is visible. In this case, the base body 202 comprises an elongated opening corresponding to each connection member. The first connection member 204*a* is shown connected to the base body 202, while the second connection member 204*b* is shown separate to the mounting device 200 to clearly illustrate the structure of the sliding mechanism. In this case, the attachment member 210 is integrated with the base body 202. Whilst a ball joint is shown, it will be appreciated that the attachment member could be of any suitable type, for example a magnetic assembly.

In the embodiment shown, the base body 202 has a first opening 214*a* for receiving the first connection member 204*a*, and a second opening 214*b* for receiving the second connection member 204*b*. The first and second elongated openings 214*a-b* extend from respective ends of the base body 202 towards the centre of the base body 202. Each connection member 204*a-b* is slidably arranged in a respective opening 214*a-b*. The slidability is enabled by countersunk surfaces 216*a-b* arranged in the base body 202 adjacent to each opening 214*a-b* for supporting the respective connection member 204*a-b*. The countersunk surfaces 216*a-b* extend around the perimeter of their respective opening 214*a-b*. Similarly to FIG. 4A, the connection members 204 each comprise a head portion 218*a-b* configured to connect the respective connection member 204*a-b* to the base body 202. Specifically, the head portion 218 of a connection member 204 sits on a respective countersunk surface 216*a-b*. It will be appreciated that each of the first and second connection members 204*a-b* could be positioned at any point between its respective end of the base body 202 and a most central position at the other end of its respective opening 214*a-b*. The use of the openings 214 to receive the connection members 204 enables simple assembly of the mounting device 200, as each connection member 204*a-b* can be slid into the base body 202 from the open end of its respective opening 214*a-b*. When the cover is attached, the open ends are closed and the connection members 204 are held in their respective openings.

Similarly to FIG. 4A, each connection member 204*a-b* also comprises an engagement element 220*a-b*, for example an O-ring, which function in the same manner as discussed above. The engagement elements 220 may be formed of a resilient material, such as rubber. Each engagement element 220*a-b* is configured to contact a corresponding inner surface 222*a-b* of the respective opening 214*a-b* to provide a degree of resistance against the sliding of the connection member 204*a-b* in the opening 214*a-b*, as discussed above.

Whilst sliding mechanisms have been illustrated in FIGS. 4A and 4B, it will be envisaged that other mechanisms for providing translation of the connections members 204 relative to the base body 202 and to each other would be possible. For example, the connection members 204 may be translatable between a number of fixed pre-set positions along the length of the base body 202. Such a translation mechanism would also provide a device with increased versatility compared to a device with connection members in a single fixed position relative to the base body. In some embodiments, one connection member 204 may be slidably translatable and one connection member 204 may be translatable between a number of fixed pre-set positions.

As discussed above, each connection member 204 has a connection portion 212 protruding away from the rear side 208 of the base body 202. These are described in more detail in relation to FIGS. 5A-D and 6. As discussed above, each connection portion 212 comprises at least one slot 226, configured to receive a bar of a grille. To form the at least one slot 226, each connection portion 212 comprises a plurality of tongues 224 spaced apart such that they form the slot 226. This enables the mounting device 200 to be attached to a grille of a vehicle 80.

Figure 5A:
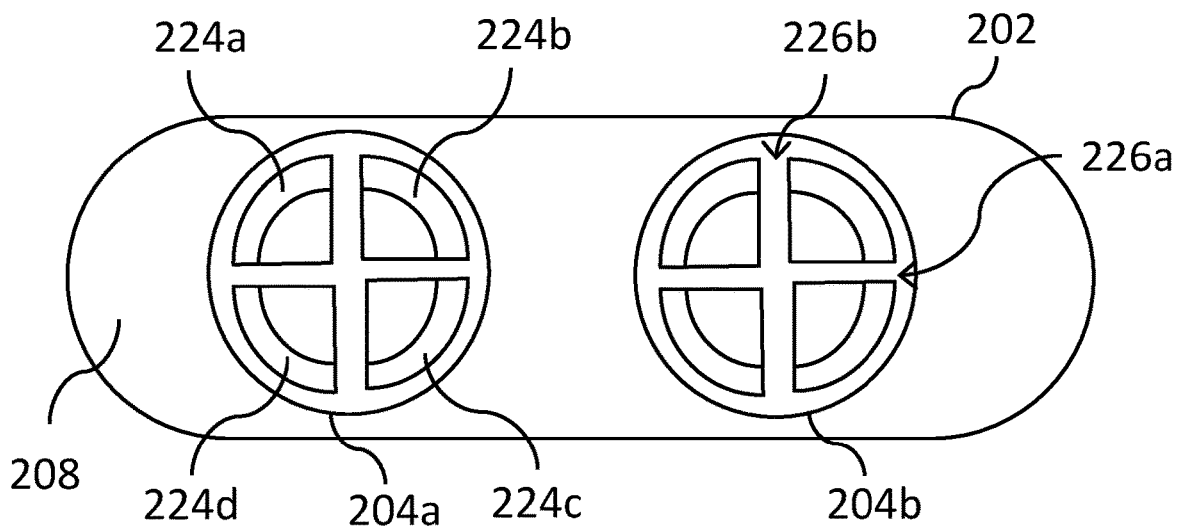
FIG. 5A illustrates a mounting device with connection members arranged in a rotatable position.

FIG. 5A shows a mounting device 200 from a view looking at the rear side 208 of the base body 202. The first connection member 204a comprises four tongues 224a-d extending away from the rear side 208 of the base body 202. Whilst the tongues 224 are described in relation to the first connection member 204a, it will be appreciated that other connection members 204 of the mounting device 200, including the second connection member 204b, may have the same or similar configurations. The first tongue 224a and the second tongue 224b form a first pair, while the third tongue 224c and the fourth tongue 224d form a second pair. The first and second pairs of tongues are spaced apart by a constant distance so as to form a first slot 226a between them, as indicated on the second connection member 204b. Similarly, the first tongue 224a and the fourth tongue 224d form a third pair, while the second tongue 224b and the third tongue 224c form a fourth pair. The third and fourth pairs of tongues are spaced apart by a constant distance so as to form a second slot 226b between them, as indicated on the second connection member 204b. Each slot 226 is configured to receive a bar of a grille when the mounting device 200 is installed.

The first slot 226a is perpendicular to the second slot 226b. In FIG. 5A, the first slot 226a is aligned with or parallel to the length of the base body 202, and the second slot 226b is aligned with or parallel to the width of the base body 202. This enables the mounting device 200 to be attached to grilles having either horizontal or vertical bars (or bars that are perpendicularly arranged), thus increasing the versatility of the device 200. It will be appreciated that other arrangements of slots, for example non-perpendicular to each other, could be implemented.

As also shown in FIG. 5A, the first slot 226a may be narrower than the second slot 226b. This enables the mounting device 200 to be attached to grilles having bars of different thicknesses, further increasing the versatility of the mounting device 200. Whilst four tongues 224, forming two perpendicular slots 226, are shown in FIGS. 5A-D, it will be appreciated that other configurations of the connection portions 212 would be considered by the skilled person to enable the connection portions 212 to attach the mounting device 200 to a grille.

In some embodiments, the connection portions 212 are rotatable about their respective centre axes. This is achieved by journaling the connection portion 212 of each connection member 204 in the respective head portion 218 such that the connection portion 212 may be rotated relative to the head portion 218. This will be explained in relation to FIG. 6. As such, the orientation of the respective slots 226 of the connection portions 212 relative to the base body 202 may be varied. This is shown in FIGS. 5B-D.

Figure 5B:
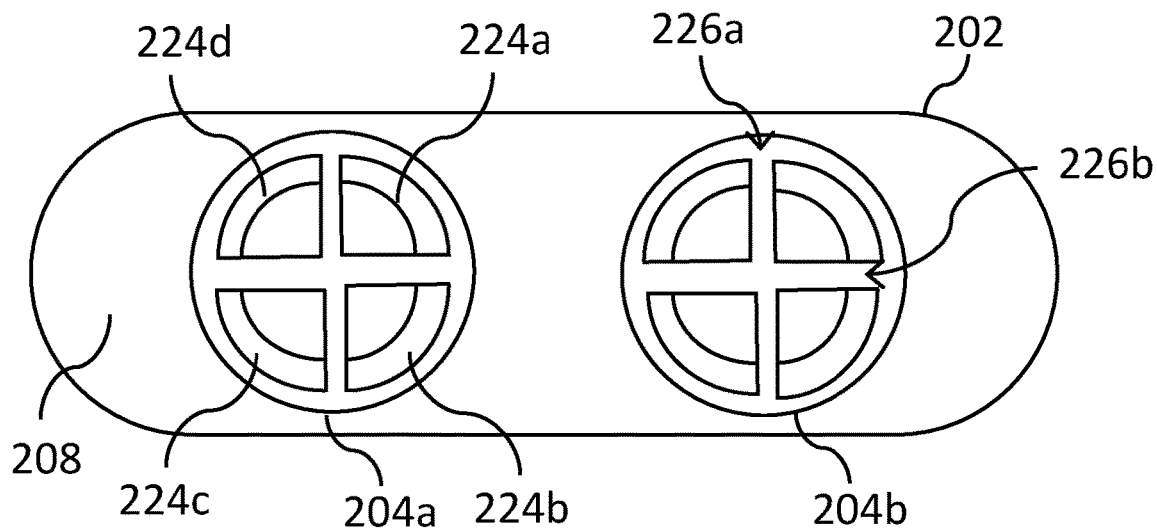
FIG. 5B illustrates the mounting device with connection members arranged in a different rotatable position.
Figure 5C:
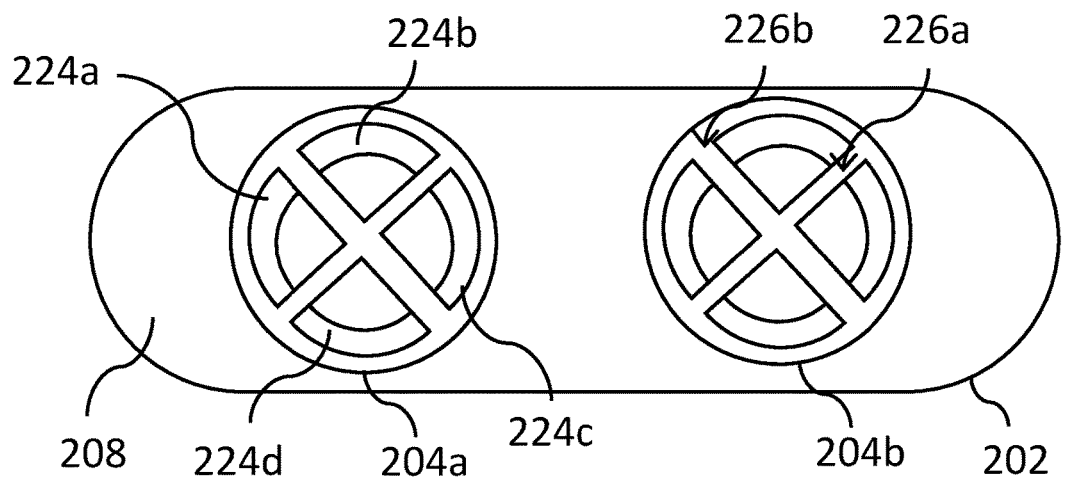
FIG. 5C illustrates the mounting device with connection members arranged in a different rotatable position.
Figure 5D:
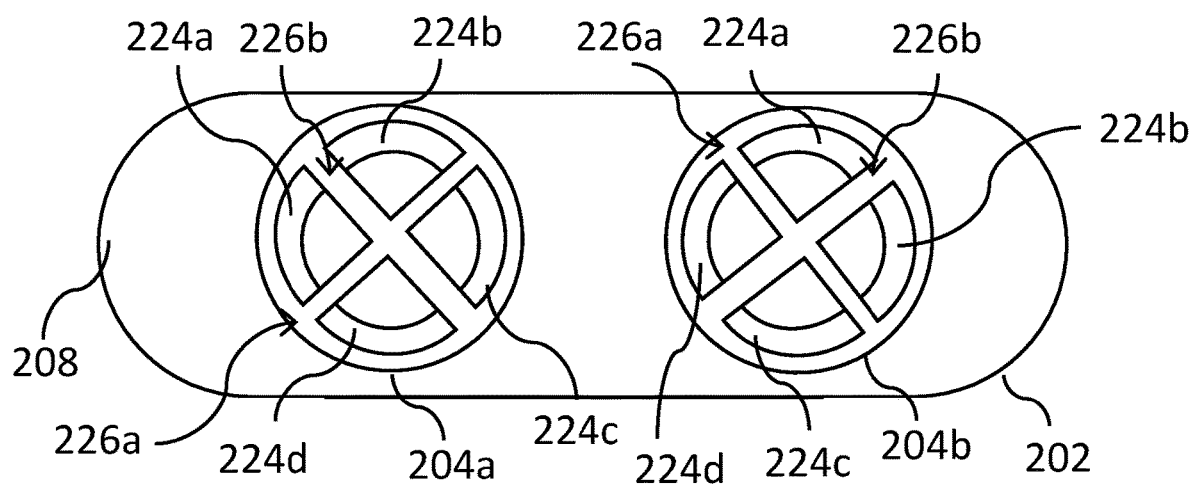
FIG. 5D illustrates the mounting device with connection members arranged in a different rotatable position.

As shown in FIG. 5B, the connection portions 212 have been rotated clockwise by 90° with respect to the positions shown in FIG. 5A. As such, the first slot 226a is now aligned with or parallel to the width of the base body 202, and the second slot 226b is now aligned with or parallel to the length of the base body 202. As shown in FIG. 5C, the connection portions 212 have been rotated anticlockwise by approximately 45° with respect to the positions shown in FIG. 5A. This enables the user to configure the connection portions 212 to connect to grilles having bars of different orientations and thicknesses.

The connection portions 212 may, in some embodiments, be independently rotatable. As shown in FIG. 5D, the first connection portion 212a has been rotated anticlockwise by approximately 45° with respect to the position shown in FIG. 5A, while the second connection portion 212b has been rotated clockwise by approximately 45° with respect to the position shown in FIG. 5A. In this configuration, the first slot 226a of the first connection portion 212a is perpendicular to the first slot 226a of the second connection portion 212b. Similarly, the second slot 226b of the first connection portion 212a is perpendicular to the second slot 226b of the second connection portion 212b. Whilst rotations of 0°, 45° and 90° are shown in FIGS. 5A-D, it will be appreciated that any desired degree of rotation between 0° and 360° can be implemented.

By enabling rotation of the connection portions 212 of the connection members 204, the orientation of the respective slots 226 may be varied. This enables a mounting device 200 to be attached to grilles having bars of different orientations, further increasing the versatility of the device 200.

Figure 6:
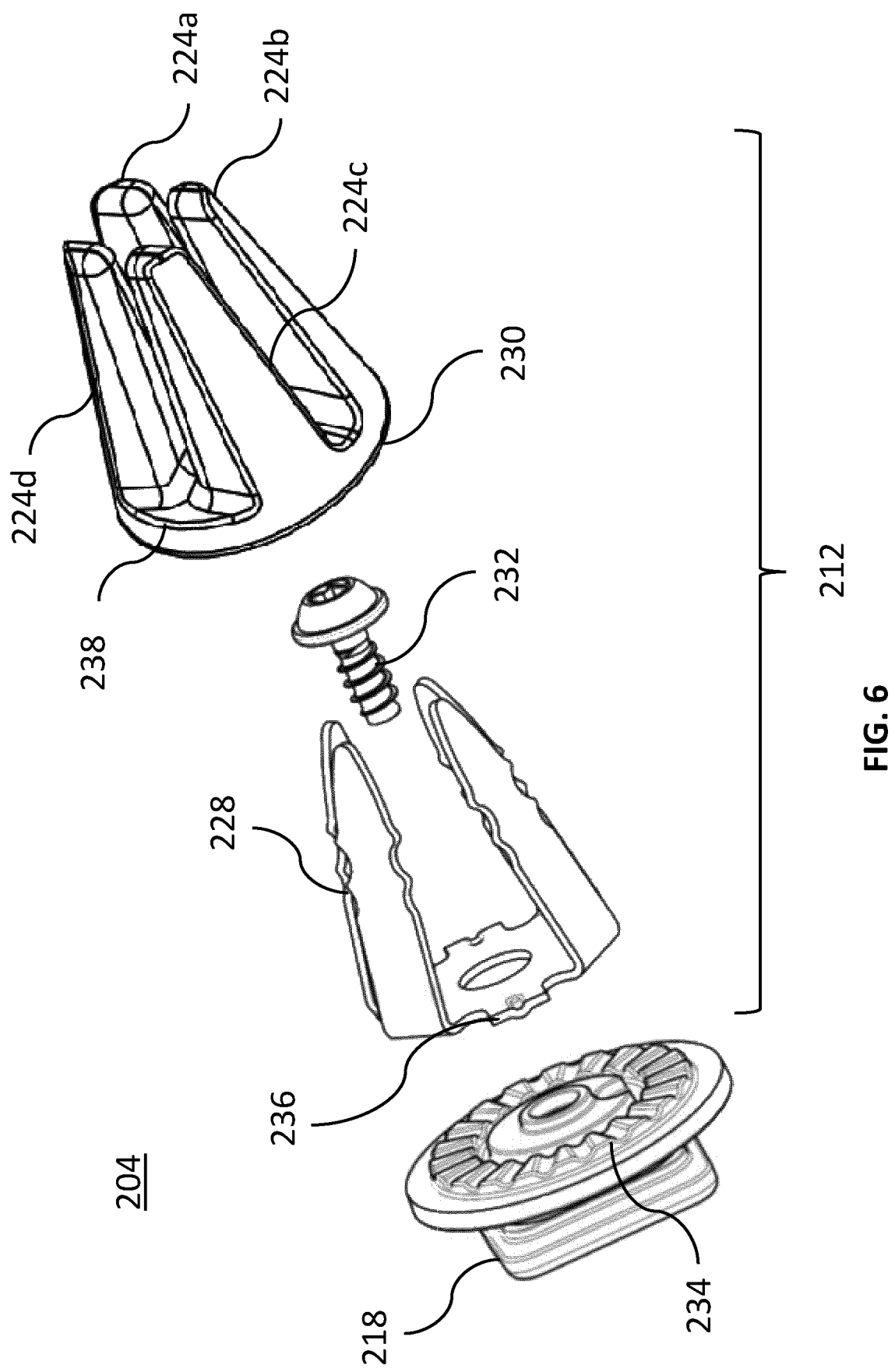
FIG. 6 illustrates a locking mechanism according to an embodiment.

FIG. 6 shows an exploded view of a connection member 204. The connection portion 212 may comprise two principal components: a frame portion 228 and a cover portion 230. The frame portion 228 is configured to be connected to the head portion 218 of the connection member 204. To enable the rotation discussed in relation to FIGS. 5A-D, the frame portion 228 may be journalled in the head portion 218 to enable it to rotate with respect to the head portion. The connection between the frame portion 228 and the head portion 218 may be made using a screw 232. The cover portion 230 is configured to fit over the frame portion 228. The tongues 224 of the cover portion 230 are configured to fit over corresponding parts of the frame portion, and may be formed of a pliable material, such as rubber, to enable easy attachment and detachment to bars of a grille. The cover portion 230 may comprise one or more cutouts 238, which give the cover portion 230 a rotationally asymmetric form. This enables a user to perceive the rotational orientation of the connection member 204 more easily.

To enable a secure positioning of the connection portion 212 once a suitable degree of rotation has been selected by the user U, in some embodiments the connection members 204 have a locking mechanism arranged between the head portion 218 and the connection portion 212. The locking mechanism is configured such that the orientation of the slots 226 is releasably locked in one of a number of rotation positions. In some embodiments, the locking mechanism may be a rack and pinion-type device.

Specifically, the head portion 218 may comprise one or more teeth 234 disposed in a circle around the centre of the head portion 218, and the connection portion 212 may have at least one latch 236 configured to interact with the teeth 234 of the head portion 218. In one example, the latch 236 is configured as a pawl. In FIG. 6, the latch 236 is part of the frame portion 228 of the connection portion 212. Each tooth may define a different rotation position. For example, if the head portion 218 were to have 36 teeth, 36 rotation positions would be defined. These may be regularly or irregularly spaced. In the example with 36 teeth and in the case that the teeth 234 are regularly spaced around the centre of the head portion 218, the respective rotation positions may be 10° apart. It will be appreciated that any suitable number of teeth 234 and latches 236 could be used. When the connection portion 212 is rotated, the latch 236 may releasably engage with the teeth 234 of the head portion 218. Once a rotation position of the connection portion 212 has been selected by the user U, the engagement between the latch 236 and the teeth 234 either side of that position serves to resist motion of the connection portion 212 away from the selected rotation position and thus hold the connection portion 212 in place. The engagement may be such that the position is releasable on application of a rotation force by the user, but is otherwise locked. In this way, when the connection portion 212 is positioned in a given rotation position, that positioning is maintained when the mounting device 200 is attached to a grille of a vehicle, and a secure connection and orientation is provided.

It will be envisaged that, in some embodiments, a mounting device 200 may have connection members having both the translation functionality and the rotation functionality discussed above. This combination of functionality enables a mounting device 200 to be attached to grilles of different shapes and sizes, and grilles having bars of different orientations, spacing and thicknesses. As such, the mounting device 200 can provide a secure connection in a large number of different configurations and is thus suitable for use in a large number of different vehicles.

Figure 7:
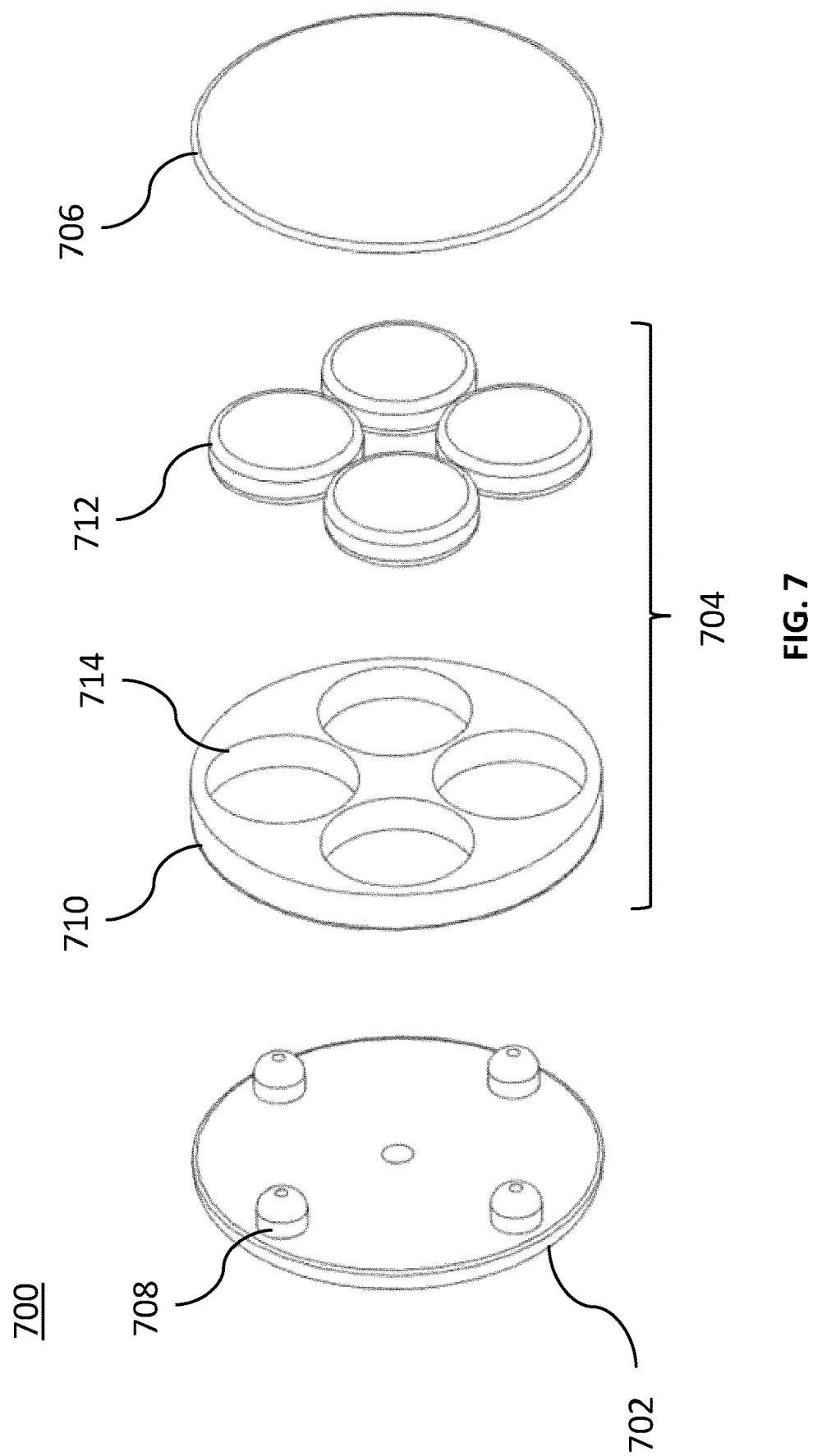
FIG. 7 illustrates a magnetic assembly according to an embodiment.

As discussed above, the mounting device 200a has an attachment member 210 comprising a magnetic assembly. An example of a magnetic assembly 700 is shown in FIG. 7.

The magnetic assembly 700 comprises an attachment plate 702, a magnet layer 704 and a contact layer 706. These elements can be assembled together and coupled to a connection member 204. A respective magnetic assembly 700 may be coupled to one or more of the connection members 204 of a mounting device 200, or to the base body 202.

In some embodiments, the attachment plate 702 comprises a fastening element (not shown) on its rear face for connection to a corresponding part of a connection member 204, for example the fastening element 223 shown in FIG. 4A. The attachment plate 702 is made of a ferromagnetic material, for example steel. This enables a magnetic connection between the attachment plate 702 and the magnet layer 704. On its front face, the attachment plate 702 comprises a number of studs 708 for connection to corresponding recesses (not shown) on the rear face of the magnet layer 704. Four studs 708 are shown in FIG. 7, but it will be appreciated that any number and orientation of studs 708 may be used that achieves the desired attachment between the attachment plate 702 and the magnet layer 704.

The magnet layer 704 comprises a base 710 and a number of magnets 712. The base 710 has a number of recesses 714 formed in its front face. It will be appreciated that the base 710 may additionally or alternatively have a number of recesses 714 formed in its rear face. Each recess 714 is configured to receive a respective magnet 712. The magnets provide a magnetic field for attachment of the magnet layer 704 to the attachment plate 702 on one side, and attachment of the magnetic assembly 700 to a peripheral device, such as a media playback device 104 or an intermediate device, on the other side. The peripheral device may comprise a corresponding ferromagnetic portion such that a magnetic attachment is made between the magnetic assembly and the peripheral device. Four magnets are shown in FIG. 7, but it will be appreciated that any number and orientation of magnets may be used that achieves the desired attachment between a mounting device 200 and a peripheral device.

The rear face of the base 710 comprises a number of recesses (not shown) for receipt of the studs 708 of the attachment plate 702. The interaction between the studs 708 and the recesses prevents relative rotation between the attachment plate 702 and the magnet layer 704. It will be appreciated that, in some embodiments, the studs could be present on the rear face of the base 710 with corresponding recesses on the front face of the attachment plate 702.

The magnetic connection between the attachment plate 702 and the magnet layer 704 enables the sub-assembly of the magnet layer 704 and contact layer 706 to be separated from the attachment plate 702. The sub-assembly can then be connected to another mounting device 200 having a suitable attachment plate 702. As such, the sub-assembly can be used with a number of different mounting devices.

The contact layer 706 is attached on the front of the magnet layer 704. This may be achieved by adhesion, or any other suitable means. In use, the contact layer 706 is placed in contact with a peripheral device. In some embodiments, the contact layer 706 is formed of a frictional material such as rubber, to provide a more robust connection to the peripheral device.

By using a magnetic attachment member 210, such as an attachment member 210 comprising the magnetic assembly 700 shown in FIG. 7, a mounting device 200 can be detachably connected to a peripheral device, such as a media playback device 104. In this way, the user U can easily switch between different media playback devices 104 using the same mounting device 200, and need not have a separate mounting device 200 for each media playback device 104. This may also enable the user U to switch between media playback devices 104 while the mounting device 200 is installed. It will be appreciated that the structure and function of a magnetic attachment member 210 may be different from that shown in FIG. 7 whilst still performing the function of detachably connecting the mounting device 200 to a peripheral device.

FIGS. 8A-E illustrate a mounting device 200 when installed on a grille 300. FIGS. 8A-E show how a mounting device such as those described above can provide a secure connection in a large number of different configurations to grilles of different shapes and sizes, with bars of different orientations, spacing and thicknesses. No attachment members 210 are shown in FIGS. 8A-E in order to provide a clear representation of the illustrated orientations.

FIG. 8A illustrates a mounting device 200 when installed on a grille 300 having horizontal bars 302. The mounting device 200 is installed horizontally on the grille 300. In this case, the first slot 226a of each connection member 204 is also arranged horizontally such that it receives one of the horizontal bars 302 of the grille 300. The connection members 204 thus provide a secure connection to the grille 300 for supporting a media playback device 104.

FIG. 8B illustrates a mounting device 200 when installed on a grille 300 having vertical bars 302. In this case, the mounting device 200 is installed at an angle of approximately 45° relative to the grille 300. In this case, the slot 226a of each connection member 204 is arranged vertically such that it receives one of the horizontal bars 302 of the grille 300. This can be achieved by rotating the connection portion 212 of each connection member 204 by approximately 45°. This provides an alternative configuration for mounting a media playback device 104 on a grille 300.

FIG. 8C illustrates a mounting device 200 when installed on a grille 300 having horizontal bars 302. In this case, the bars 302 are thicker than the bars shown in FIG. 8A. The mounting device 200 is installed vertically on the grille 300. In this case, the wider second slot 226b of each connection member 204 is arranged horizontally such that it receives one of the horizontal bars 302 of the grille 300. The connection members 204 thus provide a secure connection to a grille 300 having thicker bars. This also provides an alternative configuration for mounting a media playback device 104 on a grille 300.

FIG. 8D illustrates a mounting device 200 when installed across two grilles 300a-b. The grilles 300a-b are smaller than the grilles shown in FIGS. 8A-C, and so the mounting device may not fit comfortably on a single one of the grilles 300a-b. The first grille 300a has horizontal bars 302a, while the second grille 300b has vertical bars 302b. The mounting device 200 is installed horizontally across the grilles 300a-b. In this case, the slot 226a of the first connection member 204a is arranged horizontally such that it receives one of the horizontal bars 302a of the first grille 300a. The slot 226a of the second connection member 204b is arranged vertically such that it receives one of the vertical bars 302b of the second grille 300b. The connection members 204 thus provide a secure connection across two grilles 300a-b for supporting a media playback device 104.

FIG. 8E illustrates a mounting device 200 when installed on an elliptical grille 300 having diagonal bars 302. The mounting device 200 is installed horizontally on the grille 300. In this case, the slot 226a of each connection member 204 is arranged parallel to the bars 302 of the grille 300, such that it receives one of the diagonal bars 302 of the grille 300. This can be achieved by rotating the connection portion 212 of each connection member 204 by the same angle as the tilt of the bars 302. The connection members 204 thus provide a secure connection to a different shaped grille 300 with a different orientation of bars 302.

It will be appreciated that the examples shown in FIGS. 8A-E are for the purposes of illustration only, and the implementation of a mounting device 200 is not limited to these configurations. By using the translation and rotation functionality appropriately, the user U can install the mounting device in a number of different ways, taking into account the shape and size of the grille, as well as the thickness and orientation of the bars.

A mounting device such as those described above is able to securely support a media playback device in a vehicle. It is simple to install and remove and can be reused numerous times. Due to its translation and rotation functionality, the mounting device can provide a connection in a large number of different configurations to grilles of different shapes and sizes, with bars of different orientations, spacing and thicknesses.

The mounting device can then be attached to a media playback device such that the media playback device can be easily seen and accessed by a driver of the vehicle. The mounting device can be attached and removed as the user desires, so that it can be moved for example between different vehicles.

The foregoing description of embodiments of the present disclosure has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. An apparatus for supporting a media playback device on a structure of a vehicle comprising a grille, the apparatus comprising:
   an elongate base body having a front side configured to connect the apparatus to the media playback device and a rear side; and
   first and second connection members, each comprising a respective connection portion protruding away from the rear side of the base body and comprising at least one slot configured to receive a bar of a grille;
   wherein the first and second connection members are translatably arranged such that a distance between the first and second connection members may be varied;
   wherein at least one of the first and second connection members is slidably arranged such that the distance between the first and second connection members may be varied; and
   wherein the at least one slidably arranged connection member comprises an engagement element configured to engage the base body and allow sliding motion of the connection member relative to the base body when a user applies a sliding force, and to resist sliding motion of the connection member relative to the base body when a user does not apply a sliding force.

2. The apparatus according to claim 1, wherein the base body comprises an elongated opening extending along a length of the base body, wherein the first and second connection members are slidably arranged in the elongated opening.

3. The apparatus according to claim 2, wherein the base body comprises a countersunk surface arranged adjacent to the elongated opening for supporting the respective first and second connection members.

4. The apparatus according to claim 2, wherein the first and second connection members each comprise an engagement element configured to engage the base body and allow sliding motion of the connection member relative to the base body when a user applies a sliding force, and to resist sliding motion of the connection member relative to the base body when a user does not apply a sliding force.

5. The apparatus according to claim 1, wherein the connection portions of the first and second connection members each comprise at least two tongues, arranged spaced apart, so that a slot configured to receive a bar of a grille is formed therebetween.

6. The apparatus according to claim 1, wherein the first and second connection portions are rotatably arranged about their respective centre axes so that the orientation of the respective slots of the first and second connection portions may be varied.

7. The apparatus according to claim 6, wherein:
   the first and second connection members each comprise a head portion configured to connect the respective connection member to the base body; and
   the connection portion of each connection member is journalled in the respective head portion such that the connection portion may be rotated relative to the head portion.

8. The apparatus according to claim 7, wherein the first and second connection members each comprise a locking mechanism arranged between the head portion and the connection portion and configured such that the orientation of the slot is releasably locked.

9. The apparatus according to claim 7, further comprising an attachment member disposed in front of the base body, the attachment member configured to connect the apparatus to the media playback device.

10. The apparatus according to claim 9, wherein the attachment member comprises a magnetic element.

11. The apparatus according to claim 10, wherein the magnetic element is removably attached to the apparatus.

12. The apparatus according to claim 9, wherein the attachment member is connected to the first or second connection member.

13. The apparatus according to claim 9, wherein the attachment member is connected to the base body.

14. An apparatus for supporting a media playback device on a structure of a vehicle comprising a grille, the apparatus comprising:
- an elongate base body having a front side configured to connect the apparatus to the media playback device and a rear side; and
- first and second connection members, each comprising a respective connection portion protruding away from the rear side of the base body and comprising at least one slot configured to receive a bar of a grille;
- wherein the first and second connection members are translatably arranged such that a distance between the first and second connection members may be varied;
- wherein the first and second connection portions are rotatably arranged about their respective centre axes so that the orientation of the respective slots of the first and second connection portions may be varied; and
- the first and second connection members each comprise a locking mechanism configured such that the orientation of the at least one slot is releasably locked.

15. The apparatus according to claim 14, further comprising an attachment member disposed in front of the base body, the attachment member configured to connect the apparatus to the media playback device.

16. The apparatus according to claim 15, wherein the attachment member comprises a magnetic element.

17. The apparatus according to claim 16, wherein the magnetic element is removably attached to the apparatus.

18. The apparatus according to claim 15, wherein the attachment member is connected to the first or second connection member.

19. The apparatus according to claim 15, wherein:
- the first and second connection members each comprise a head portion configured to connect the respective connection member to the base body; and
- the connection portion of each connection member is journalled in the respective head portion such that the connection portion may be rotated relative to the head portion.

* * * * *